US007913157B1

(12) United States Patent
Stoakley et al.

(10) Patent No.: US 7,913,157 B1
(45) Date of Patent: Mar. 22, 2011

(54) METHOD AND SYSTEM FOR THE AUTHORING AND PLAYBACK OF INDEPENDENT, SYNCHRONIZED MEDIA THROUGH THE USE OF A RELATIVE VIRTUAL TIME CODE

(75) Inventors: Richard Wales Stoakley, Seattle, WA (US); Laura Janet Butler, Seattle, WA (US); Joseph H. Matthews, III, Woodinville, WA (US)

(73) Assignee: Overcast Media Incorporated, Seattle, WA (US)

( * ) Notice: Subject to any disclaimer, the term of this patent is extended or adjusted under 35 U.S.C. 154(b) by 909 days.

(21) Appl. No.: 11/736,352

(22) Filed: Apr. 17, 2007

Related U.S. Application Data

(60) Provisional application No. 60/793,300, filed on Apr. 18, 2006, provisional application No. 60/793,110, filed on Apr. 18, 2006.

(51) Int. Cl.
*G06F 17/00* (2006.01)
(52) U.S. Cl. ........ 715/203; 715/201; 715/202; 715/204; 715/723; 725/135; 725/136; 386/12; 386/61; 386/65; 386/66
(58) Field of Classification Search .................. 715/201, 715/202, 203, 204, 723; 386/12, 61, 65, 386/66; 725/135, 136
See application file for complete search history.

(56) References Cited

U.S. PATENT DOCUMENTS

| | | | |
|---|---|---|---|
| 6,006,241 A * | 12/1999 | Purnaveja et al. | 715/205 |
| 6,177,931 B1 | 1/2001 | Alexander et al. | |
| 6,188,396 B1 * | 2/2001 | Boezeman et al. | 715/202 |
| 6,266,053 B1 | 7/2001 | French et al. | |
| 6,357,042 B2 * | 3/2002 | Srinivasan et al. | 725/32 |
| 6,445,740 B1 * | 9/2002 | Mallart et al. | 375/240.08 |
| 6,665,835 B1 * | 12/2003 | Gutfreund et al. | 715/202 |
| 6,792,615 B1 | 9/2004 | Rowe et al. | |
| 6,802,019 B1 | 10/2004 | Lauder | |
| 7,096,416 B1 | 8/2006 | Smith et al. | |
| 7,143,177 B1 | 11/2006 | Johnson et al. | |
| 7,164,714 B2 * | 1/2007 | Martin | 375/240.01 |

(Continued)

OTHER PUBLICATIONS

Carsten Herpel, Fernando Pereira, Touradj Ebrahimi, The MPEG-4 Book, Jul. 10, 2002, Prentice Hall, Chapter 3.*

(Continued)

*Primary Examiner* — Stephen S Hong
*Assistant Examiner* — I-Chan Yang
(74) *Attorney, Agent, or Firm* — Schwabe, Williamson & Wyatt, P.C.

(57) ABSTRACT

A method and system is provided for the creation and playback of multiple independently produced and distributed media intended for synchronized playback. One embodiment of the invention overcomes variances in independently produced and distributed media that make accurate synchronization impossible today. The system utilizes both authoring and playback processes. During authoring, a relative virtual time code profile is generated based on the original source media in a defined associated media set. The system employs an extensible framework of multiple synchronization recognizers that analyze the source media to generate a relative virtual time code profile for the associated media set. During playback, the system's client can access the relative virtual time code profile to coordinate the synchronized playback of an associated media set. The system generates an absolute time code using the available associated media and the original relative virtual time code profile. The system can overcome significant variances between the available associated media and the original associated media such as missing content, added content, resolution differences, format differences, etc.

27 Claims, 12 Drawing Sheets

*Project Authoring*

U.S. PATENT DOCUMENTS

| | | | |
|---|---|---|---|
| 7,174,560 B1 * | 2/2007 | Crinon | 725/60 |
| 7,177,520 B2 * | 2/2007 | Zetts | 386/52 |
| 7,412,533 B1 | 8/2008 | Johnson et al. | |
| 7,428,696 B2 * | 9/2008 | Shin | 715/203 |
| 7,450,826 B2 * | 11/2008 | Lasorsa et al. | 386/125 |
| 7,548,565 B2 * | 6/2009 | Sull et al. | 370/503 |
| 7,555,196 B1 * | 6/2009 | Crawford et al. | 386/46 |
| 7,570,692 B2 * | 8/2009 | Ahn et al. | 375/240.28 |
| 7,650,361 B1 | 1/2010 | Wong et al. | |
| 7,774,375 B2 * | 8/2010 | Rudolph et al. | 707/802 |
| 2002/0053078 A1 * | 5/2002 | Holtz et al. | 725/14 |
| 2002/0069218 A1 * | 6/2002 | Sull et al. | 707/501.1 |
| 2002/0092019 A1 | 7/2002 | Marcus | |
| 2002/0112247 A1 | 8/2002 | Horner et al. | |
| 2002/0152117 A1 | 10/2002 | Cristofalo et al. | |
| 2002/0168176 A1 | 11/2002 | Iizuka et al. | |
| 2003/0177503 A1 * | 9/2003 | Sull et al. | 725/112 |
| 2003/0188321 A1 * | 10/2003 | Shoff et al. | 725/135 |
| 2003/0229899 A1 | 12/2003 | Thompson et al. | |
| 2003/0229900 A1 | 12/2003 | Reisman | |
| 2004/0025186 A1 | 2/2004 | Jennings et al. | |
| 2004/0111742 A1 | 6/2004 | Hendricks et al. | |
| 2004/0220926 A1 * | 11/2004 | Lamkin et al. | 707/3 |
| 2005/0015815 A1 * | 1/2005 | Shoff et al. | 725/135 |
| 2005/0210498 A1 | 9/2005 | Scott et al. | |
| 2005/0229220 A1 | 10/2005 | Fisher et al. | |
| 2006/0015580 A1 | 1/2006 | Gabriel et al. | |
| 2006/0064716 A1 | 3/2006 | Sull et al. | |
| 2006/0085816 A1 | 4/2006 | Funk et al. | |
| 2006/0117350 A1 | 6/2006 | Stallworth | |
| 2006/0117365 A1 | 6/2006 | Ueda et al. | |
| 2006/0129907 A1 | 6/2006 | Volk et al. | |
| 2007/0033170 A1 | 2/2007 | Sull et al. | |
| 2007/0067707 A1 * | 3/2007 | Travis et al. | 715/500.1 |
| 2007/0118425 A1 | 5/2007 | Yruski et al. | |

OTHER PUBLICATIONS

Office Action, issued in U.S. Appl. No. 11/690,389, mailed Mar. 4, 2010.

Office Action, issued in U.S. Appl. No. 11/690,399, mailed Jan. 22, 2010.

Qazi, N. et al, "A Synchronization and Communication Model for Distributed Multimedia Objects," Proceedings of the first ACM international conference on multimedia, Aug. 2, 1993, pp. 147-155.

Final Office Action, mailed Jul. 7, 2010, for U.S. Appl. No. 11/690,399, 17 pages.

Final Office Action mailed Aug. 17, 2010 in U.S. Appl. No. 11/690,389.

Celentano et al., "Schema Modeling for Automatic Generation of Multimedia Presentations," ACM, 2002, pp. 593-600.

Office Action for U.S. Appl. No. 12/103,530, mailed Jan. 19, 2011, 28 pages.

Gaggi et al, "Modeling Synchronized Hypermedia Presentations", published: Sep. 2005, publisher: Springer Science, Multimedia Tools and Applications - vol. 27, pp. 53-78.

* cited by examiner

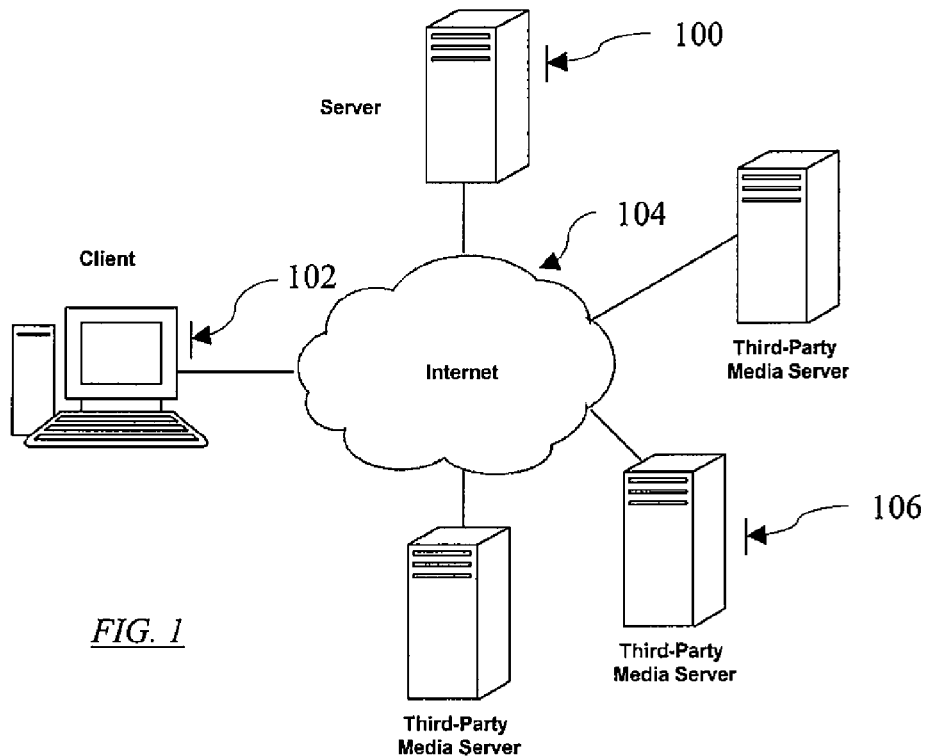
FIG. 1
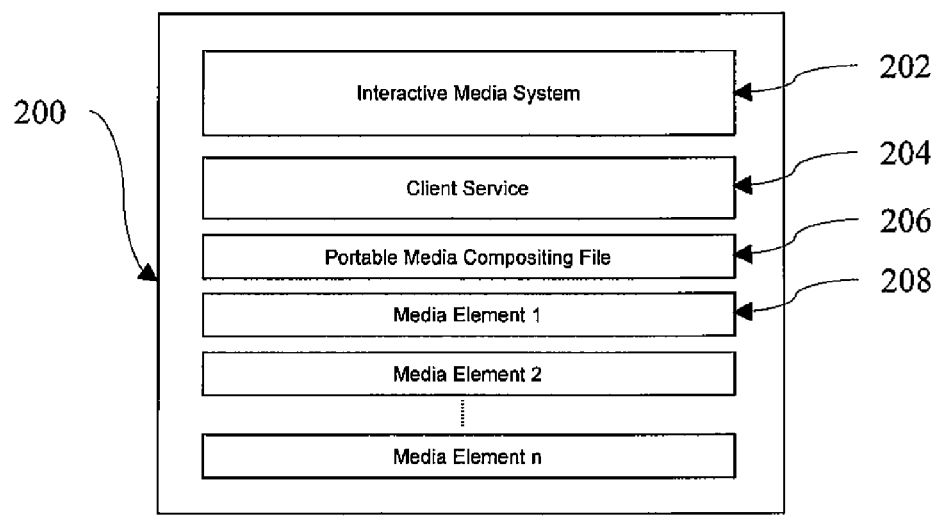
FIG. 2 – System Client

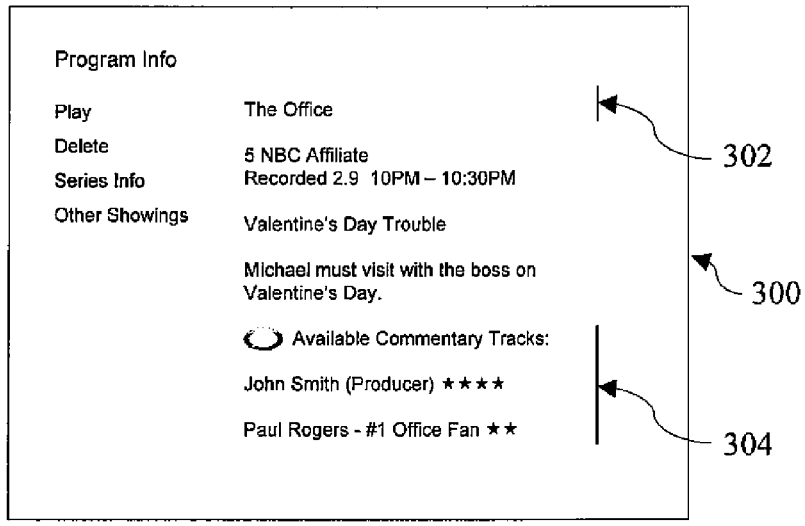
FIG. 3
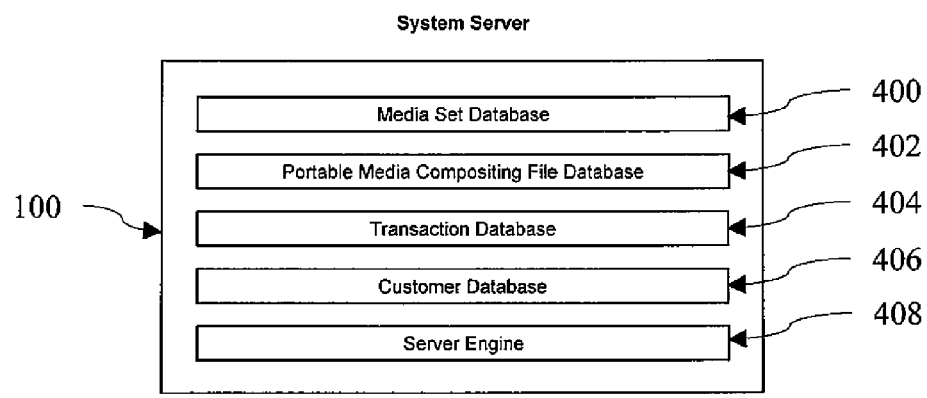
FIG. 4 – System Server

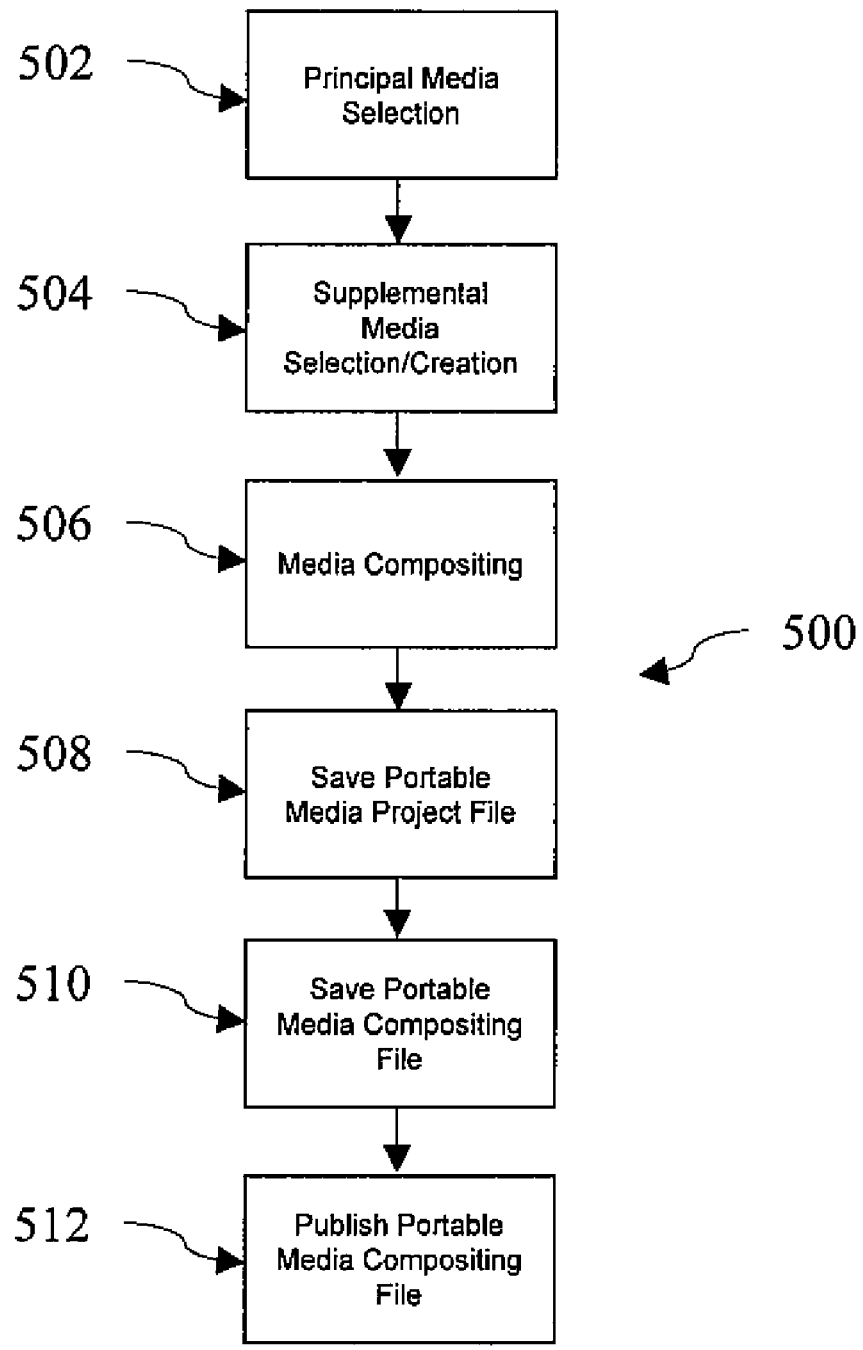
*FIG. 5 – Authoring Process*

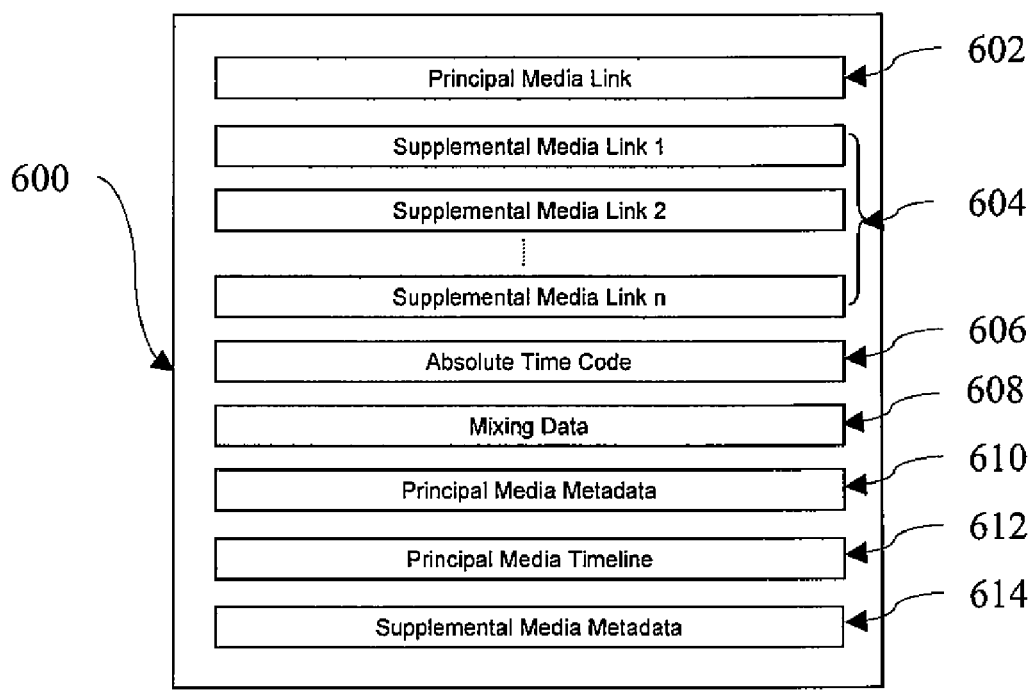
*FIG. 6 – Portable Media Project File*

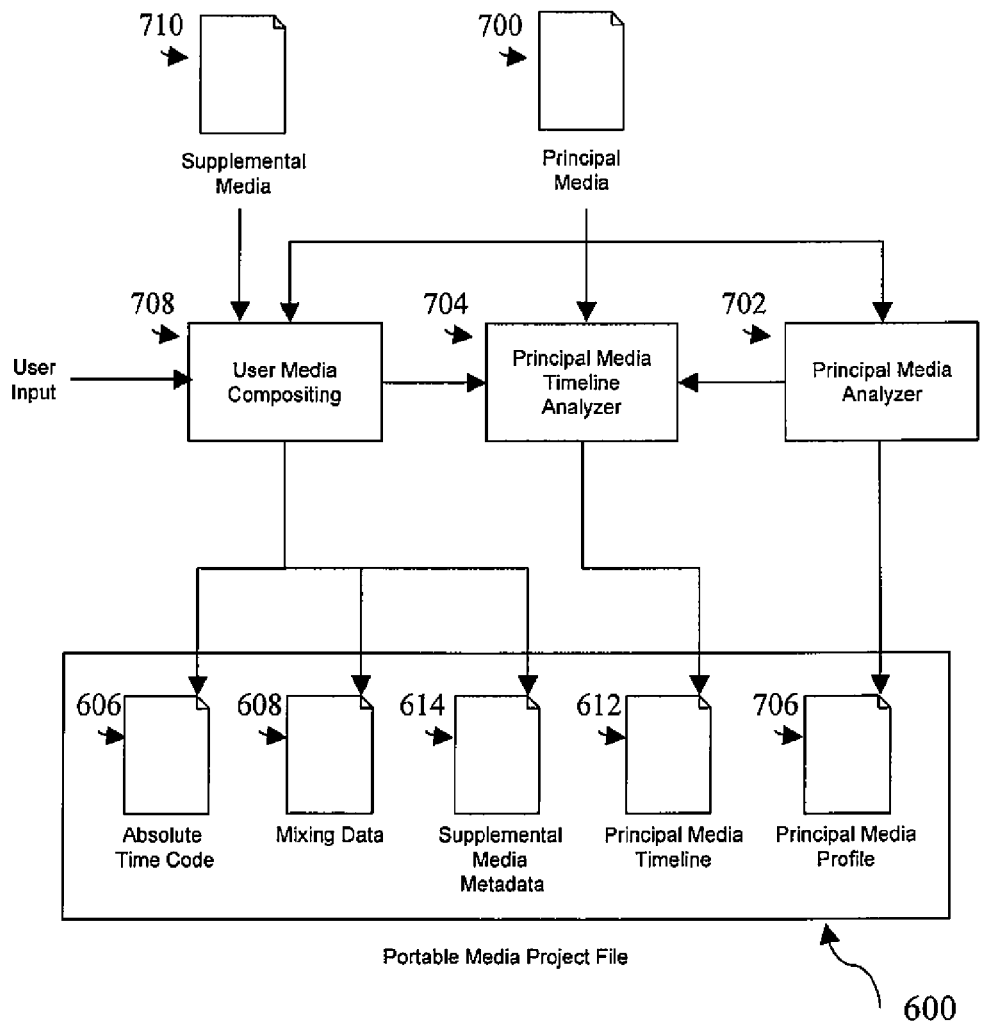
FIG. 7 – Project Authoring

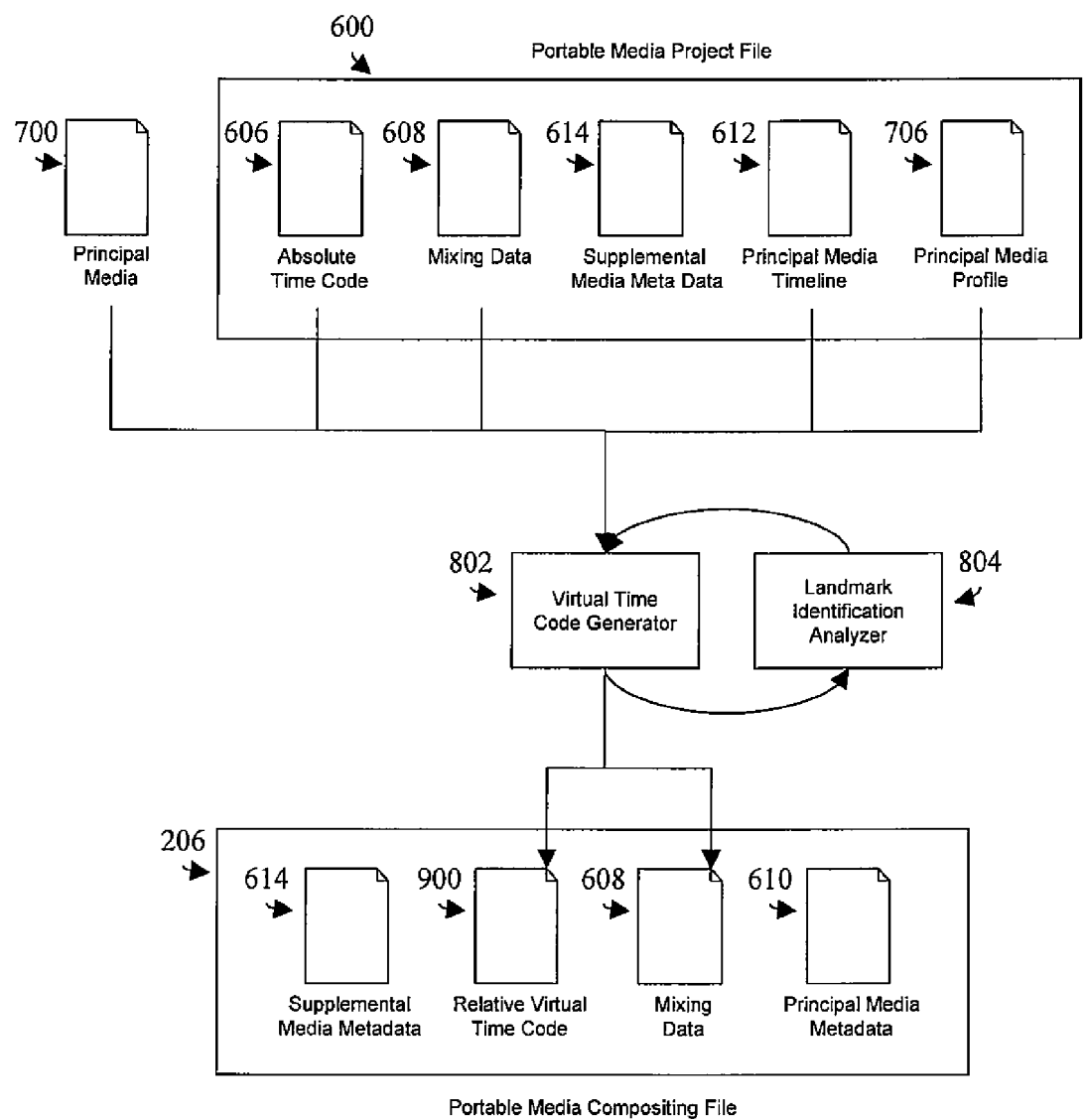
FIG. 8 – *Exporting Portable Media Compositing File*

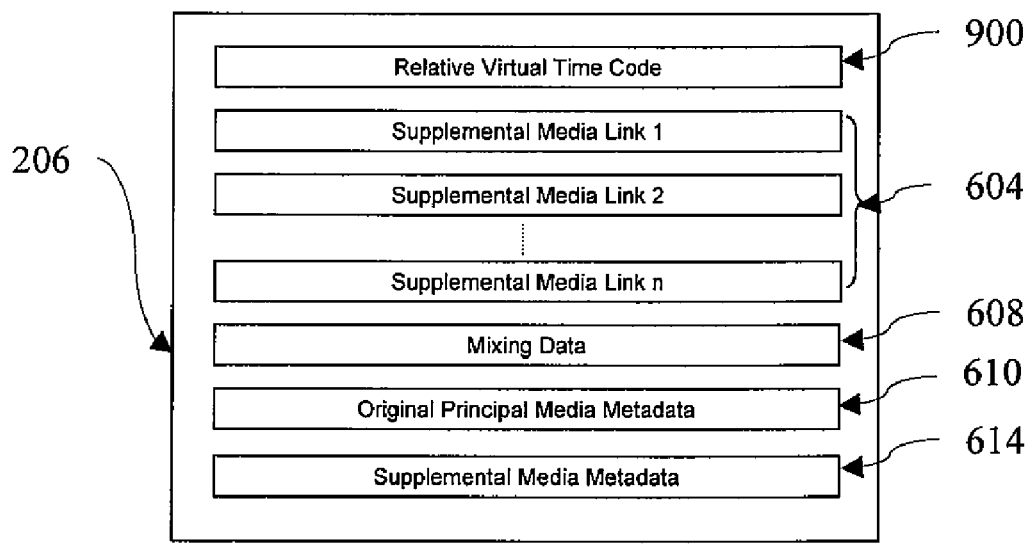
FIG. 9 – Portable Media Compositing File
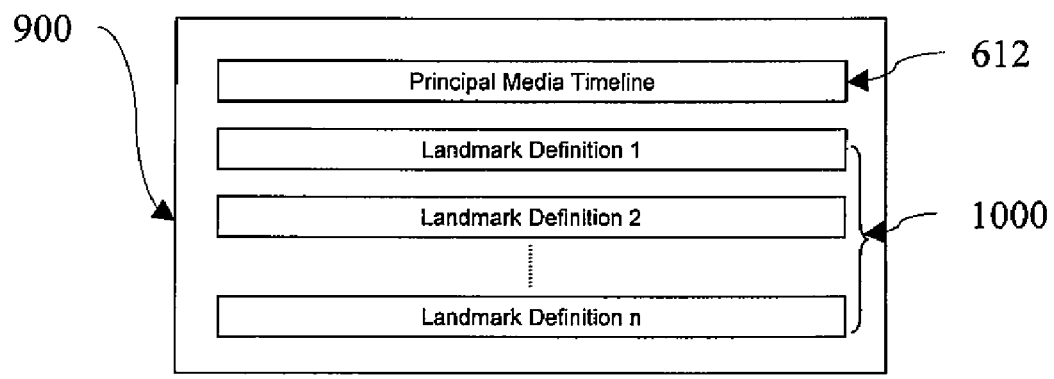
FIG. 10 – Relative Virtual Time Code

*FIG. 13 – Principal Media Analysis for Playback*

FIG. 14 – Resolving Absolute Time Code for Playback

FIG. 15 – Landmark Resolution Process

US 7,913,157 B1

METHOD AND SYSTEM FOR THE AUTHORING AND PLAYBACK OF INDEPENDENT, SYNCHRONIZED MEDIA THROUGH THE USE OF A RELATIVE VIRTUAL TIME CODE

CROSS-REFERENCE TO RELATED APPLICATIONS

This application claims priority under 35 U.S.C. §119(e) to U.S. Provisional Patent Application Ser. No. 60/793,300, entitled "METHOD AND SYSTEM FOR THE AUTHORING AND PLAYBACK OF INDEPENDENT, SYNCHRONIZED MEDIA THROUGH THE USE OF A RELATIVE VIRTUAL TIME CODE," filed Apr. 18, 2006, with inventors Richard Wales Stoakley, Laura Janet Butler, and Joseph H. Matthews III, and also claims priority under 35 U.S.C. §119(e) to U.S. Provisional Patent Application Ser. No. 60/793,110, entitled "RELATIVE VIRTUAL TIME CODE AND SYNCHRONIZATION FILE FORMAT," filed Apr. 18, 2006, with inventors Laura Janet Butler, Richard Wales Stoakley, and Joseph H. Matthews III, both of which are assigned to the same assignee as the present application and are incorporated herein by reference in their entireties.

This application also incorporates herein by reference in their entireties all of the following applications owned by the same assignee as the present application: U.S. patent application Ser. No. 11/690,389, entitled "SYSTEMS AND METHODS FOR USER INTERFACES FOR CONTROLLING INDEPENDENT SYNCHRONIZED MEDIA," filed Mar. 23, 2007, with inventors Joseph H. Matthews III, Richard Wales Stoakley, and Laura Janet Butler, which in turn claims priority under 35 U.S.C. §119(e) to U.S. Provisional Patent Application Ser. No. 60/785,789, entitled "SYSTEMS AND METHODS FOR USER INTERFACES FOR CONTROLLING INDEPENDENT SYNCHRONIZED MEDIA," filed Mar. 24, 2006, with inventors Joseph H. Matthews III, Richard Wales Stoakley, and Laura Janet Butler; U.S. patent application Ser. No. 11/690,399, entitled "METHOD AND SYSTEM FOR MONETIZATION OF MULTIPLE INDEPENDENT, SYNCHRONIZED MEDIA," filed Mar. 23, 2007, with inventors Joseph H. Matthews III and Richard Wales Stoakley, which in turn claims priority under 35 U.S.C. §119(e) to U.S. Provisional Patent Application Ser. No. 60/785,791, entitled "METHOD AND SYSTEM FOR MONETIZATION OF MULTIPLE INDEPENDENT, SYNCHRONIZED MEDIA," filed Mar. 24, 2006, with inventors Joseph H. Matthews III and Richard Wales Stoakley.

TECHNICAL FIELD

This disclosure generally relates to interactive entertainment systems, such as interactive television systems, network-connected personal computers or mobile devices such as video iPods or media-capable cell phones. More particularly but not exclusively, this disclosure relates to a computer method and system for authoring and playing multiple independent, synchronized media.

BACKGROUND INFORMATION

Video content, in all of its various forms of distribution, is delivered to a viewer as a continuous data stream. Movies distributed on digital video discs (DVDs) are one example of video content distributed as a continuous data stream. Television video content, such as broadcast television shows and pay-per-view movies, is delivered to a viewer as a continuous data stream. Today, television programming is distributed and received at homes via antenna, cable or increasingly via other means such as digital cable/satellite, digital download or Internet Protocol (IP)-based streaming.

BRIEF SUMMARY OF THE INVENTION

In each of the prior art methods for delivering and receiving video content, there is no seamless opportunity to view supplemental content that has been designed, produced and distributed independently but with the intent for simultaneous viewing with the video content. Such supplemental content can be created containing audio, video, animation, graphics, text, interactive links or other metadata.

Similarly, prior art methods of video-based content distributed by other means (such as internet video files, and internet video streaming) do not offer the opportunity to view supplemental content that has been designed and produced independently but with the intent for simultaneous viewing with the video content. This collection of video content and supplemental content designed for simultaneous viewing is referred to as a "synchronous media set." Individual items in the synchronous media set are referred to as "synchronous media elements."

Viewers of DVD movies are familiar with supplemental content that is produced and made available on the DVD and thru DVD players. This capability, however, is limited to the content on the DVD and is controlled by the copyright holder. Because the supplemental content distributed on DVDs is produced with the knowledge of the content on the DVD, dynamic synchronization capability is not required by the DVD player.

As media distribution moves from closed and restricted distribution networks to open distribution networks and as digital media tools move from expensive proprietary systems to inexpensive and widely available tools, the amount of media content that is developed with the purpose of being played with independently created and distributed content will increase dramatically.

For media content developed with the purpose of being played with independently created and distributed content, no system exists which: 1) allows an author to select and composite independent media files for the future playback over similar but different independent media files; 2) utilizes a framework for the coordinated application of multiple media recognizers to analyze and understand the media elements in the synchronous media set; 3) develops a relative virtual time code profile for the synchronous media set and the desired authored playback experience; 4) utilizes the relative virtual time code profile at playback to generate an absolute time code for the available media elements in the synchronous media set; and 5) allows the author to establish how the supplemental content will be composited with other media in the synchronous media set.

Accordingly, a system and method that overcomes the problems and disadvantages that exist in the prior art is needed to allow viewers to easily enjoy the playback of associated independent, synchronized media. In particular, the inventors have designed a method and system for overcoming these disadvantages in the prior art so that the playback of the independent media in a synchronous media set is possible and can be played synchronously despite the variances that exist between the media elements which exist at the point of playback and the media elements which existed at the time the synchronous media set was originally authored.

One embodiment provided by the present inventors is directed towards a method. The method includes enabling authoring of a media set, enabling selection of a first independent media element associated with a first entity, enabling selection of at least a second independent media element associated with a second entity, and enabling presenting of the first and second media elements together as the media set in a synchronous manner using a relative virtual time code, wherein said relative virtual time code includes an intermediary data structure containing a collection of patterns and time-based relationships used to generate an absolute time code for variations of the media elements in the synchronous media set and wherein said absolute time code includes a fixed time code for specific instances of the media elements in the synchronous media set.

Other embodiments are directed towards an article of manufacture that includes a machine-readable medium having instructions stored thereon; a system; and an apparatus.

In one embodiment, the article of manufacture includes a machine-readable medium having instructions stored thereon that are executable by a processor to:

select a first independent media element, associated with a first entity, as a principal media element;

select or create a second independent media element, associated with a second entity, as a supplemental media element;

perform media compositing to relate presentation of the principal and supplemental media elements to each other;

generate a portable media project file that contains results of the media compositing;

generate a portable media compositing file from the portable media project file; and publish the portable media compositing file, the portable media compositing file being usable to allow presentation of the media set in a synchronous manner using a relative virtual time code, wherein said relative virtual time code includes an intermediary data structure containing a collection of patterns and time-based relationships used to generate an absolute time code for variations of the media elements in the synchronous media set and wherein said absolute time code includes a fixed time code for specific instances of the media elements in the synchronous media set.

In one embodiment, the article of manufacture includes a machine-readable medium having instructions stored thereon that are executable by a processor to:

select a playback principal media element, the playback principal media element being an independent media element associated with a first entity;

select at least one supplemental media element, the supplemental media element being an independent media element associated with a second entity;

obtain a published portable media compositing file;

perform media compositing to relate the selected principal media element and the selected supplemental media element to each other using the portable media compositing file; and control playback of the media set, having the composited principal media supplemental media elements, in a synchronous manner using a relative virtual time code, wherein said relative virtual time code includes an intermediary data structure containing a collection of patterns and time-based relationships used to generate an absolute time code for variations of the media elements in the synchronous media set and wherein said absolute time code includes a fixed time code for specific instances of the media elements in the synchronous media set In one embodiment, the system includes means for authoring a media set, means for providing a first independent media element associated with a first entity, means for providing at least a second independent media element associated with a second entity, and means for presenting the first and second media elements together as the media set in a synchronous manner using a relative virtual time code, wherein said relative virtual time code includes an intermediary data structure containing a collection of patterns and time-based relationships used to generate an absolute time code for variations of the media elements in the synchronous media set and wherein said absolute time code includes a fixed time code for specific instances of the media elements in the synchronous media set.

In one embodiment, an authoring apparatus is provided that includes:

a first tool to select a first independent media element, associated with a first entity, as a principal media element;

a second tool to select or create a second independent media element, associated with a second entity, as a supplemental media element;

a third tool to perform media compositing to relate presentation of the principal and supplemental media elements to each other;

a fourth tool to generate a portable media project file that contains results of the media compositing;

a fifth tool to generate a portable media compositing file from the portable media project file; and a sixth tool to publish the portable media compositing file, the portable media compositing file being usable to allow presentation of the media set in a synchronous manner using a relative virtual time code, wherein said relative virtual time code includes an intermediary data structure containing a collection of patterns and time-based relationships used to generate an absolute time code for variations of the media elements in the synchronous media set and wherein said absolute time code includes a fixed time code for specific instances of the media elements in the synchronous media set.

In one embodiment, a presentation apparatus is provided that includes:

a first tool to select a playback principal media element, the playback principal media element being an independent media element associated with a first entity;

a second tool to select at least one supplemental media element, the supplemental media element being an independent media element associated with a second entity;

a third tool to obtain a published portable media compositing file;

a fourth tool to perform media compositing to relate the selected principal media element and the selected supplemental media element to each other using the portable media compositing file; and a fifth tool to control playback of the media set, having the composited principal media supplemental media elements, in a synchronous manner using a relative virtual time code, wherein said relative virtual time code includes an intermediary data structure containing a collection of patterns and time-based relationships used to generate an absolute time code for variations of the media elements in the synchronous media set and wherein said absolute time code includes a fixed time code for specific instances of the media elements in the synchronous media set.

BRIEF DESCRIPTION OF THE SEVERAL VIEWS OF THE DRAWINGS

Non-limiting and non-exhaustive embodiments of the present invention are described with reference to the following figures, wherein like reference numerals refer to like parts throughout the various views unless otherwise specified.

FIG. 1 is a schematic diagram illustrating an embodiment of the overall system.

FIG. 2 illustrates example elements contained in the system's client-side component according to an embodiment.

FIG. 3 is an illustration of a media player's user interface (UI) for presenting access to certain features according to an embodiment.

FIG. 4 is a block diagram illustrating example elements contained in an embodiment's server-side component.

FIG. 5 is a flowchart of example steps an author takes to create a set of associated media intended for synchronized playback according to an embodiment.

FIG. 6 is a block diagram illustrating example components that are stored in an embodiment of the invention's portable media project file.

FIG. 7 is a flowchart detailing an embodiment of a process for generating the portable media project file for a synchronous media set.

FIG. 8 is a flowchart detailing an embodiment of a process to create the portable media compositing file.

FIG. 9 is a block diagram illustrating example components in an embodiment of the invention's portable media compositing file.

FIG. 10 is a block diagram illustrating example components that make up the relative virtual time code according to an embodiment.

DETAILED DESCRIPTION

Figures 11, 12:
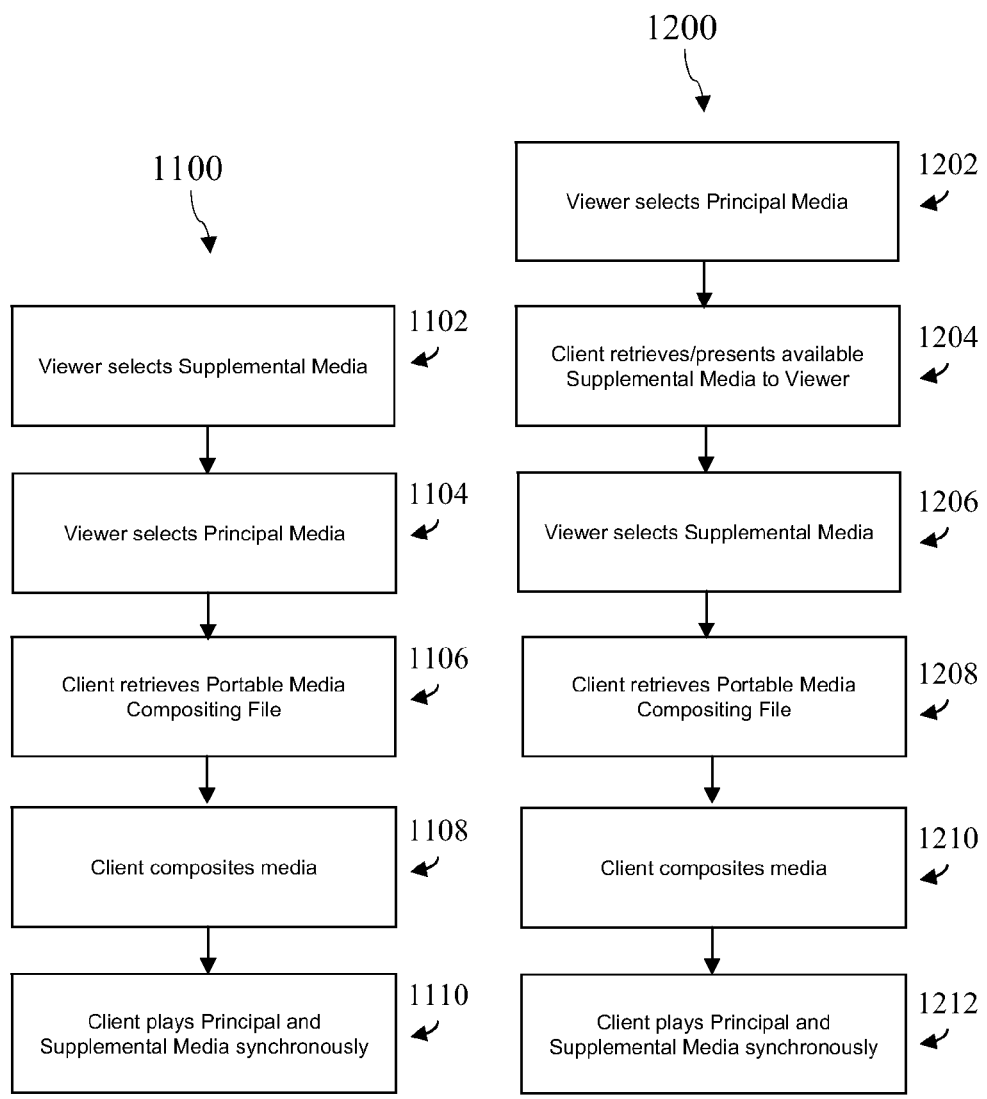
FIG. 11 is a flowchart for playing a synchronous media set after the viewer has first selected the supplemental media according to an embodiment.
FIG. 12 is a flowchart for playing a synchronous media set after the viewer has first selected the playback principal media according to an embodiment.

In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

One or more embodiments of the present invention provides a method and system to be utilized by interactive entertainment systems to at least substantially guarantee the simultaneous playback of two or more independent, synchronized media files or streams. The media files or streams in a synchronous media set can be files, streaming media or cached/partial files, or other types of content.

According to one embodiment, authoring and playback of synchronized media files is provided through the use of a relative virtual time code, which in one embodiment comprises an intermediary data structure containing a collection of patterns and time-based relationships used to generate absolute time codes for variations of a set of media elements in a synchronous media set. An absolute time code of one embodiment comprises a fixed time code for known and specific instances of a set of media elements in a synchronous media set.

FIG. 1 is an illustration of a networked environment in which one example embodiment may operate. The illustration shows the embodiment's server 100 and one or more client personal computers (PCs) or other types of client devices 102 connected via the internet 104 and/or via other network(s). The illustration also shows the availability of several third-party servers 106 also connected via the internet 104. In this illustration and in the description that follows, each PC and server is capable of communicating with every PC and server.

An embodiment of an interactive entertainment system or interactive media player exists to provide access and playback control for a library of media content. This media content includes, but is not limited to, audio, video, animation, graphics, text, interactive links or other metadata, and the content itself may reside within a media device such as a computer or a portable player or it may reside on a server that is coupled to the media device. For the purposes of this description, an interactive entertainment system or interactive media player includes all variations of systems such as, but not limited to, media software that is run on a computer, media software that is part of a computer operating system, or any dedicated interactive device which is capable of playing local or network-delivered digital media such as an cable set top box or digital video recorder.

In the networked environment embodiment of FIG. 1, media content (such as principal content and/or supplemental content) can be communicated between the various servers and client devices. Alternatively or additionally, the media content (such as principal content and/or supplemental content) can be provided via other mechanisms. For example, the principal content may be available online, while the supplemental content may be available on a portable storage device (such as a DVD), or vice versa. In yet another example, both principal and supplemental content may be available on portable storage devices, or otherwise made available to the client devices without necessarily being required to be downloaded and/or streamed from a network location.

An embodiment of a client-side interactive entertainment system 200 is shown in FIG. 2, which can be present at the client device 102. Specifically, FIG. 2 shows a block diagram of an embodiment of a representative interactive entertainment system 200 at the client side that includes an interactive media system 202, a client service 204, a portable media compositing file 206 that may have been downloaded or otherwise obtained and stored, and one or more media elements 208. One example of an interactive entertainment system is a web browser displaying a web page containing a video file. Another example of an interactive entertainment system is a dedicated set-top-box connected to an IP-based network. The embodiments can be applied to the broadest definitions of interactive entertainment systems.

The embodiment of the client-side interactive entertainment system 200 of FIG. 2 includes the interactive media system 202, which can perform the above-mentioned tasks of displaying a web page containing a video file, communicating with an IP-based network, and various other operations related to playback of synchronous media sets as will be described in further detail below. The client-side interactive entertainment system 200 can also include one or more client services 204 that cooperate with the interactive media system 202 to communicate with external components or to otherwise manage operation of the client-side interactive entertainment system 200. The client-side interactive entertainment system 200 of FIG. 2 can also be configured to store the portable media compositing file 206 (which will be described in further detail below, and also described in the priority application identified above, entitled "RELATIVE VIRTUAL TIME CODE AND SYNCHRONIZATION FILE FORMAT") and at least one media element 1-n (shown at 208).

"Independent, synchronized media" refers to a set of media wherein at least one of the media in the set has been selected with the intent that at least two of the entire set of media should be played at the same time in a synchronous manner. One media in the set is referred to as the "principal media element". The additional media elements in the set are referred to as "supplemental media elements." The supplemental media elements are created to augment a principal media element. This collection of principal content and supplemental content designed for simultaneous viewing is referred to as a "synchronous media set." Individual items in the synchronous media set are referred to as "synchronous media elements."

Further, each synchronous media element in a synchronous media set is truly independent. For each synchronous media element the following characteristics are involved: each synchronous media element may be authored by a different author, each synchronous media element may be distributed in different digital or physical methods, each synchronous media element may have been acquired by the viewer at different times, each synchronous media element may have different digital rights management rules, or each synchronous media element may have a unique licensing agreement or no licenses agreement at all, or other characteristics. These differences serve as examples to help describe what is meant by synchronous media elements that are independent from one another. The number of differences which distinguish synchronous media elements should be considered unlimited.

There are many methods for adding principal media elements to a library of media content that is accessible by an interactive entertainment system, such as the client-side interactive entertainment system 200 of FIG. 2. A digital file of a television show can be created from a broadcast television signal using a digital video recorder. Alternatively or additionally, a digital file of a television show can be purchased from an internet-based video service such as iTunes or Google Video. Alternatively or additionally, a digital file of a television show may have been purchased and accessed on a DVD disc via a retail DVD set purchase. Alternatively or additionally, a digital file of a television show may be streamed to the viewer's interactive entertainment system 200 from an internet-based video service. These examples for a television program are presented for illustration and do not represent the complete range of methods that can be used for acquiring digital content.

The many different methods for acquiring principal media elements can result in principal media element files which may represent the same program but which have different characteristics and variances. These variances increase the challenge of synchronizing one or more synchronous media elements to a particular synchronous media element. Suppose an audio commentary has been generated for an episode of Survivor. Viewer A may have recorded the target Survivor episode using a digital video recorder. Viewer A's digital recording of the Survivor episode contains the commercials that were broadcasted and the file is 60 minutes in length. Viewer B also has a digital file of the same target Survivor episode but Viewer B has purchased this digital file from Apples iTunes service. Viewer B's digital file of the same target Survivor episode does not contain commercials and is 45 minutes in length. Variances in digital files is not limited to total time or presence of commercials and can result from a multitude of issues involved with file creation, transmission and storage. Examples of other variances are file format, bit-rate of recorded media, frames per second, video aspect ratio and number of audio channels, or other parameters.

FIG. 3 illustrates an example media set presented to the viewer in an example embodiment of a user interface 300 of an interactive media system. The media set in this illustration comprises of a television program video file "The Office" (Item 302 in FIG. 3) and two audio commentary tracks (Item 304 in FIG. 3). The viewer can choose to watch "The Office" played together with one of the two audio commentary tracks, with both of the audio commentary tracks, or with none of the audio commentary tracks. This illustration is one example of combinations which are unlimited in the number of synchronous media elements, type and combination thereof.

FIG. 4 is a block diagram that illustrates example elements that make up an embodiment of the system's server 100. The system's server 100 contains a media set database 400 which stores the information that defines sets of independent, synchronized media. Each media set record contains information about the synchronous media elements that make up the set. This information includes, but is not limited to, information about ownership, distribution and identification, and other information. This media set record also contains the pointer to a portable media compositing file that is associated with the media set and its synchronous media elements. The system's server 100 stores portable media compositing files in a file database 402 or other suitable data structure.

In one embodiment, the media elements (principal and/or supplemental media elements) are not stored in the system server of FIG. 4, but rather stored at some other network location, such as at one or more third-party servers 106. Thus, rather than storing the media elements themselves in the media set database 400, the media set database 400 can store pointers, links, or other information identifying the location of the media elements.

In one embodiment, the system's server 100 may also have a customer database 406 for tracking customers and customer viewing history. The system's server 100 may also have a transaction database 404 for recording financial transaction information associated with the playback of synchronous media sets. Alternatively or additionally, such databases may be present at a third-party server 106. Further details of the operation associated with such databases are provided in the prior-filed applications entitled "METHOD AND SYSTEM FOR MONETIZATION OF MULTIPLE INDEPENDENT, SYNCHRONIZED MEDIA" that are identified above.

A server engine 408 controls operation of the server 100, including interaction between each of the elements contained in the server and/or interaction between such elements and external elements.

A synchronous media set is created, or composed, by an individual who defines the synchronous media set through the use of a computing system and client authoring software. One embodiment of the invention's authoring-related processes can be, for example, incorporated into a unique tool, incorporated within an existing tool, or added to existing tools without code changes to the existing tool by using plug-in code. The authoring tool may be a software tool installed on a PC of the author. In another embodiment, the authoring tool can comprise an online tool available on a web site. Other methods for proving and operating the authoring tool can be used FIG. 5 is a flowchart 500 that illustrates example steps taken by the individual, or author, to create a synchronous media set. The author first determines at 502 what media file will be the principal media element in the synchronous media set. The author next determines or creates at 504 the media file or files that will serve as supplemental media elements in the media set. The supplemental media elements can be any media type including but not limited to audio, video, text, graphics, animation and interactive hyperlinks, or other content. The author selects or creates the supplemental media elements with the intent of coordinating the playback of these supplemental media elements with the playback of the principal media element.

The author may select media elements from online sources, local storage, portable storage media (such as DVDs), or from other sources. The author may create media elements using any appropriate method, including video capture, assembling together of individual media elements into a single media element, and so forth.

After the media elements have been identified or created, the author's next step is media compositing at 506, which involves relating the presentation of the individual media elements to each other. For example, the author can determine a point in time when a supplemental media element can begin and end with relation to a point in the playback of the principal media element. In another example, the author can set the playback volume level relationships between the principal media element and the supplemental media elements. As an additional example, if the supplemental media element is visual, the author can also determine at what location in the video display (e.g., at which specific location within a video frame) the visual media element is to be displayed.

When the author finishes compositing the synchronous media set at 506, the author instructs the client authoring program to save the project file, which represents media and the compositing that the author has completed. This information is saved in the portable media project file by the client authoring program at 508. An embodiment of the authoring process further involves generating, saving at 510, and publishing at 512 a portable media compositing file, which will be described in further detail below.

FIG. 6 is a block diagram that illustrates example components of a portable media project file 600. Together with the synchronous media set files, these components in the portable media project file 600 contain all of the information usable to recreate the desired presentation relationship for the synchronous media set as defined by the author. The components in the portable media project file 600 include but are not limited to a link 602 to the principal media, metadata information 610 about the principal media, the timeline representation 612 of the principal media, links 604 to the supplemental media, metadata information 614 about the supplemental media, and the mixing data 608 that represents playback/presentation values between the principal and supplemental media. For example in one embodiment, the mixing data 608 describes how to composite the multiple synchronous media set elements. Specifically, for instance, the mixing data can be used to control the audio levels of the principal and supplemental media during playback. The mixing data 608 may also contain layout and display instructions to control the presentation of visual components of the supplemental media relative to the presentation of visual components of the primary media during playback. Examples of display information include but are not limited to opacity levels, color values, effect filters, etc. Furthermore, the portable media project file 600 also contains information referred to as the "absolute time code," shown at 606, which matches supplemental media segments and mixing data 608 with precise moments in the principal media using the principal media's specific timeline 612 for reference.

FIG. 7 illustrates how the tools of the client authoring software generate the portable media project file 600 according to an embodiment. The principal media file 700 selected by the author is evaluated by a principal media analyzer routine 702 that extracts metadata information and properties about the principal media file 700. This metadata information may contain information such as title, description, author, copyright information, duration and key markers or indices, or other metadata. The media analysis routine 702 also determines the type and properties of the principal media file 700. For example, if the principal media file 700 is a video file, information such as frame rate, display dimensions, input format (e.g., MPED2, WMV, etc.), and output format (e.g., interlaced RGB24, non-interlaced YUV9, etc). The principal media file 700 can be any type of media and the media analysis routine 702 is capable of recognizing and understanding all types of digital media. The principal media file metadata information is fed to other processes in the system and is also saved to a principal media profile file 706 for later use by other processes in one embodiment of the invention.

A second routine referred to as the "principal media timeline analyzer" 704 is responsible for analyzing and extracting an understanding of elements and characteristics about the actual media content data in the principal media itself. The principal media timeline analyzer 704 uses the principal media file 700 as input. All available aspects of the principal media are analyzed including, if available, its audio, video, text, metadata (like VBI-based text data) and graphics. Examples of extracted characteristics include, but are not limited to periods of silence, dramatic volume changes, wave patterns, etc. for the audio in the principal media. For video, characteristics such as periods of blackness, dramatic visual scene shifts or cuts, discernable image patterns, etc. are detected and saved. For text such as closed caption information, keywords, triggers, blank spaces, etc. are detected and saved. For graphics, characteristics such as blank field regions, discernable image patterns, etc. are detected and saved. The extracted elements and characteristics of the principal media file 700 are fed to the principal media timeline analyzer routine 704 and can also be saved to a principal media timeline file 612 for later use by other processes in one embodiment of the invention.

The principal media timeline analyzer 704 also uses the principal media profile 706 generated by the principal media analyzer 702. An additional input utilized by the principal media timeline analyzer 704 is the compositing information 708 that contains the presentation relationship between the principal media file 700 and supplemental media file(s) 710 as determined by the author. The principal media timeline analyzer 704 of one embodiment accepts input from additional input mechanisms in a pluggable manner. Each input provides direct and indirect information that assists the principal media timeline analyzer 704 in determining what key elements and characteristics are contained in the principal media 700.

The principal media timeline analyzer 704 generates a principal media timeline file 612, which is an outline description of the principal media source that represents layout of segments and time at a higher-semantic level than simple absolute time references. The description represents the principal media 700 in terms of segments, segment order, length of segments, advertisement segments, scenes within segments and other breaks or interruptions. Because the principal media timeline 612 of one embodiment is an outline description, it is capable of describing segments that are contained or nested within other segments. The principal media timeline 612 also contains information that describes the relationships between visual elements in the synchronous media set. These descriptions are stored in relative terms to that alignment can work with differently sized and formatted media files in future playback events.

When the principal media timeline analyzer 704 has completed its analysis of the principal media file 700 together with all additional input, the analyzer 704 saves the final principal media timeline file 612. The principal media timeline analyzer 704 also creates and saves the portable media project file 600, including analysis of the supplemental media 710 to extract supplemental media metadata 614 and placing the metadata 614 into the portable media project file 600.

With the portable media project file 600 fully defined and saved, the system has completed its analysis and understanding of the principal and supplemental media files 700 and 710. The system also understands the intent of the author regarding how the principal and supplemental media files 700 and 710 are to be presented in the future. The next step for the system is to develop the information that will be usable to allow for the proper playback of the supplemental media content when applied to a future playback principal media file. This information is referred to as a "relative virtual time code."

FIG. 8 is flowchart that identifies the processes, input and steps taken to generate a portable media compositing file 206. The portable media compositing file 206 is one goal in the system's authoring process. The portable media compositing file 206 enables the synchronous playback of a synchronous media set at a future time. FIG. 9 shows a block diagram of example components saved in one embodiment of the portable media compositing file 206. The portable media compositing file 206 contains links 604 to the supplemental media files. It also contains metadata information 610 and 614 about the original principal and supplemental media files. It contains the mixing information 608 for presentation of the synchronous media elements relative to the principal media. The portable media compositing file 206 also contains the relative virtual time code 900 for the synchronous media set.

The system processes described in FIG. 8, which generate the portable media compositing file 206, utilize a virtual time code generator routine 802 which uses the principal media file 700 and the portable media project file 600 as input. The virtual time code generator's 802 responsibility is to generate a series of landmark definitions which correspond to the synchronous events and relationships which exist between the primary principal and supplemental media files as determined by the authored presentation. The virtual time code generator 802 uses a landmark identification analyzer process 804, which in one embodiment is a pluggable framework for employing and coordinating multiple landmark identification routines. Landmark identification routines can include but are not limited to scene detection, voice recognition, audio level analysis, etc. The landmark identification analyzer 804 employs information about each landmark identification routine to weight and rank the results from all of the available landmark identification routines. For example, the landmark identification analyzer 804 would rank audio-based landmark routines lower than video-based landmark routines when the principal media file 700 comprises of a video without sound. Similarly, the landmark identification analyzer 804 would favor luminance-based identification routines over hue-based routines when the principal media 700 contains a black and white video.

The virtual time code generator 802 receives information from the landmark identification routine 804 and determines if it has enough information to create a relative virtual time code 900 that could be used to successfully play a synchronous media set in the future. If the virtual time code generator 802 does not have enough information, it may instruct the landmark identification analyzer 804 to either: 1) utilize additional available landmark identification routines; or 2) process again previously process segments with information that was not available at the time the segments were originally processed.

When the virtual time code generator 802 has determined it has enough information to create a portable media compositing file 206, it first saves a relative virtual time code file 900 belonging to the synchronous media set. The relative virtual time code 900 contains information used to translate the absolute time codes from the original principal media file 700 into relative time codes that will work with future playback principal media files guaranteeing that the system understands all corresponding points which exist between the original principal media file 700 and the future playback media file. The relative virtual time code 900 stores small instances of data and patterns from one or more streams from the principal media file 700. These data and patterns serve as landmarks within the principal media file 700 and can be used in the future by embodiments of the invention's playback routines. FIG. 10 shows a block diagram of example components saved in one embodiment of a relative virtual time code file 900, including the principal media timeline and landmark definitions 1-$n$ (shown at 1000).

The next step for the system is to generate a file that can be published, transmitted and used by any consumer to playback the synchronous media set in the manner intended by the author. This file is referred to as the "portable media compositing file." The virtual time code generator 802 creates and saves the portable media compositing file 206.

The final step in the authoring process of synchronous media sets is to make the portable media compositing file 206 available to consumers. See, e.g., 512 in the flowchart 500 of FIG. 5. The author utilizes the client authoring system to publish the portable media compositing file 206 to the system's server 100. As a result, consumers with interactive media systems can locate and consume the portable media compositing file 206, such as by downloading the portable media compositing file 206 into their client devices 102 for storage as shown in FIG. 2. The portable media compositing file 206 may also be transferred directly by one of many possible methods. For example, the author could send the portable media compositing file 206 to another individual as an attachment in email or as a file saved to electronic media. At this point, all appropriate steps in the authoring and creation process for synchronous media sets have been completed.

FIGS. 11 and 12 show the respective flowcharts 1100 and 1200 for two potential playback scenarios for utilizing the portable media compositing file 206 and the synchronous media set. The invention is not limited to these two playback scenarios.

In FIG. 11, the viewer first selects the supplemental media at 1102. The viewer also selects the playback principal media at 1104, which can come from any one of a number of sources. For example, the playback principal media may be on a DVD owned by the viewer. Alternatively, the playback principal media may have been recorded by the viewer using a digital recording program.

A viewer can use an interactive media system 202, such as shown in FIG. 2, which communicates with the system's server 100. Whenever the viewer requests a synchronous media element from the interactive media system 202, the interactive media system 202 sends a request to the system's server 100 to identify which, if any, media sets the selected media element may belong to. With this information, the client device 102 can display the media set and its synchronous media elements to the viewer. The viewer can review the media set and make a decision to play none, some or all of the synchronous media elements in a synchronous manner.

Once the consumer has identified two or more media elements to play synchronously, the system next determines if the viewer has access to the individual synchronous media elements that make up the media set. The synchronous media elements may be owned by the viewer and may exist as digital files on the viewer's computer hard drive. Alternatively or additionally, the viewer may have access to one or more of the synchronous media elements through a streaming media service where the media is resident on a third party server 106. Other techniques may be used to provide media elements to the viewer.

If the viewer does not have access to one or more of the individual synchronous media elements in the set, then the system is capable of referring the viewer to third party services that can provide the transaction and distribution for the viewer to attain the appropriate synchronous media element(s). The information used by the system's server 100 to identify the third party services is contained in the metadata for the media set stored on the system server 100. The third-party service may charge the viewer for the right to access and/or own the synchronous media element. This charge and transaction is handled by the third-party service. The third-party service is responsible for delivering the content or granting access to the content that the viewer has selected.

In one embodiment, because the system does not store the principal media file and because the playback principal media file can come from many sources, the playback media file may be different in some way from the original playback media file that was used by the author to define the synchronous media set. The client device 102 communicates to the system server 100 to retrieve the portable media compositing file 206 at 1106. The client device 102 composites the synchronous media set as instructed by the information contained in the portable media compositing file 206 at 1108. Finally, the client device 102 plays the playback principal media and the supplemental media in a synchronous manner matching the intent of the author at 1110.

In FIG. 12, the viewer first selects the principal media for playback at 1202. The client device 102, communicating with the system's server 100, can retrieve and present the list of available supplemental media sets for the chosen principal media at 1204. If the viewer selects a particular supplemental media set at 1206, the client device 102 downloads the appropriate supplemental media files and the portable media compositing file 206 at 1208. The client composites the synchronous media set at 1210 as instructed by the information contained in the portable media compositing file 206. Finally, the client plays the playback principal media and the supplemental media in a synchronous manner matching the intent of the author at 1212.

In FIGS. 11-12, various tools can be provided at the client device 102 to perform the various selection, retrieval, compositing, and playback operations. These tools, for instance, can be part of the interactive client-side interactive entertainment system 200, embodied as software, hardware, and/or combination of both.

Figure 13:
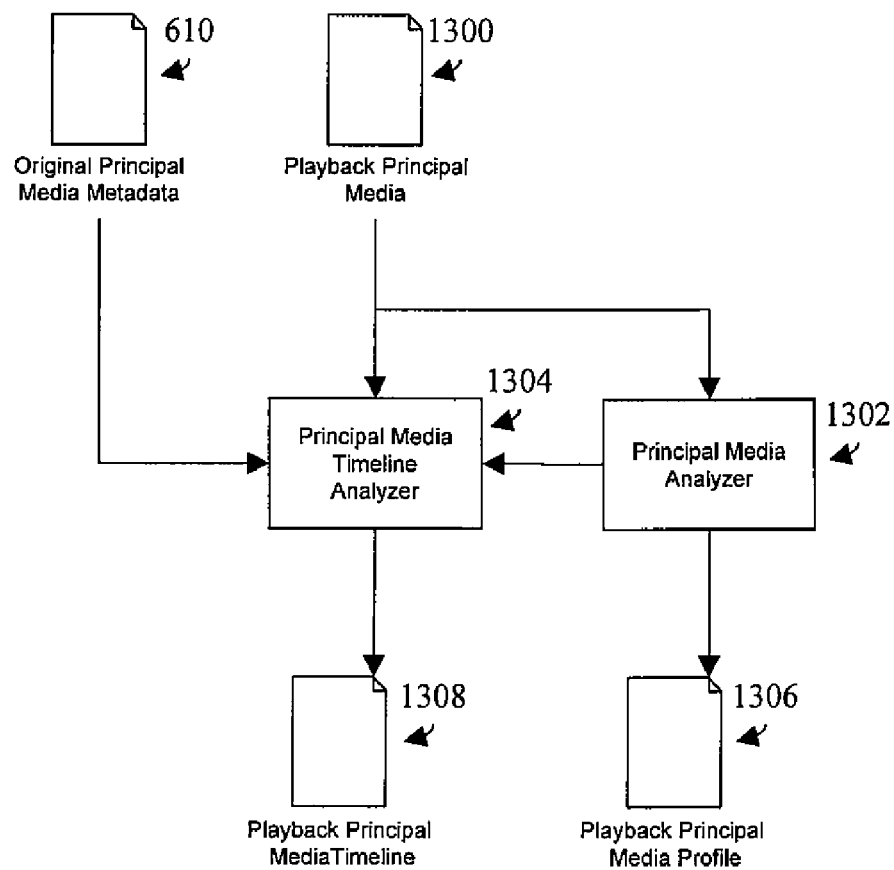
FIG. 13 is a flowchart detailing the operations involved with analyzing the playback principal media prior to the playback of the synchronous media set according to an embodiment.

The playback process for a synchronous media set begins with an analysis of the playback principal media file selected by the either the viewer or the system. FIG. 13 shows a flowchart of the steps involved in the analysis of the playback principal media file 1300 according to an embodiment. The playback principal media file 1300 selected by the viewer is evaluated by a principal media analyzer routine 1302 that extracts metadata information and properties about the playback principal media file 1300. This metadata information may contain information such as title, description, author, copyright information, duration and key markers or indices, or other information. The principal media analyzer routine 1302 also determines the type and properties of the principal media file 1300. For example, if the principal media file 1300 is a video file, information such as frame rate, display dimensions, input format (e.g., MPED2, WMV, etc.), and output format (e.g., interlaced RGB24, non-interlaced YUV9, etc). The principal media file 1300 can be any type of media and the media analysis routine 1302 is capable of recognizing and understanding all types of digital media. The principal media file metadata information is fed to other processes in the system and is also saved to a principal media profile file 1306 for later use by other processes in one embodiment of the invention.

A second routine referred to as the principal media timeline analyzer 1304 is responsible for analyzing and extracting an understanding of elements and characteristics about the actual media content data in the playback principal media 1300 itself. The principal media timeline analyzer 1304 uses the playback principal media file 1300 as input. All available aspects of the principal media 1300 are analyzed including, if available, its audio, video, text and graphics. Examples of extracted characteristics include, but are not limited to periods of silence, dramatic volume changes, wave patterns, etc. for the audio in the principal media. For video, characteristics such as periods of blackness, dramatic visual scene shifts or cuts, discernable image patterns, etc. are detected and saved. For text such as closed caption information, keywords, triggers, blank spaces, etc. are detected and saved. For graphics, characteristics such as blank field regions, discernable image patterns, etc. are detected and saved.

In an embodiment, the principal media analyzer 1302 and/or principal media timeline analyzer 1304 form part of the interactive media system 202 installed in the client device 102 of FIG. 1. The principal media analyzer 1302 and principal media timeline analyzer 1304 may be plug-ins, software modules, or other types of tools that can be installed in the client device 102, such as via download from a network location or installed from a CD. In another embodiment, the principal media analyzer 1302 and/or principal media timeline analyzer 1304 are present in a device external to the client device 102, such as remotely at a network location accessible to the client device 102.

The client device 102 retrieves the original principal media metadata 610 stored in the portable media compositing file 206, which has been downloaded or otherwise obtained by the client device 102. The original principal media metadata information 610 is sent to the principal media timeline analyzer routine 1304.

The principal media timeline analyzer 1304 also uses the principal media profile 1306 generated by the principal media analyzer 1302. The principal media timeline analyzer 1304 accepts input from additional input mechanisms in a pluggable manner in an embodiment. Each input provides direct and indirect information that assists the principal media timeline analyzer 1304 in determining what elements and characteristics are contained in the playback principal media 1300.

The playback principal media timeline analyzer 1304 generates a playback principal media timeline file 1308 which is an outline description of the playback principal media source that represents layout of segments and time at a higher-semantic level than simple timeline references. The description represents the playback principal media 1300 in terms of segments, segment order, length of segments, advertisement segments, scenes within segments and other breaks or interruptions. Because the playback principal media timeline 1308 is an outline description in one embodiment, it is capable of describing segments that are contained or nested within other segments. These descriptions are stored in relative terms so that alignment can work with differently sized and formatted media files in future playback events.

When the principal media timeline analyzer 1304 has completed its analysis of the playback principal media file 1300, the analyzer 1304 saves the final playback principal media timeline file 1308. The system has completed its analysis and understanding of the playback principal media file 1300. The next step for the system is to generate the information that will be used to allow for the proper playback of the supplemental media content when applied to the playback principal media file 1300. This information for proper playback is referred to as an absolute time code reference.

Figure 14:
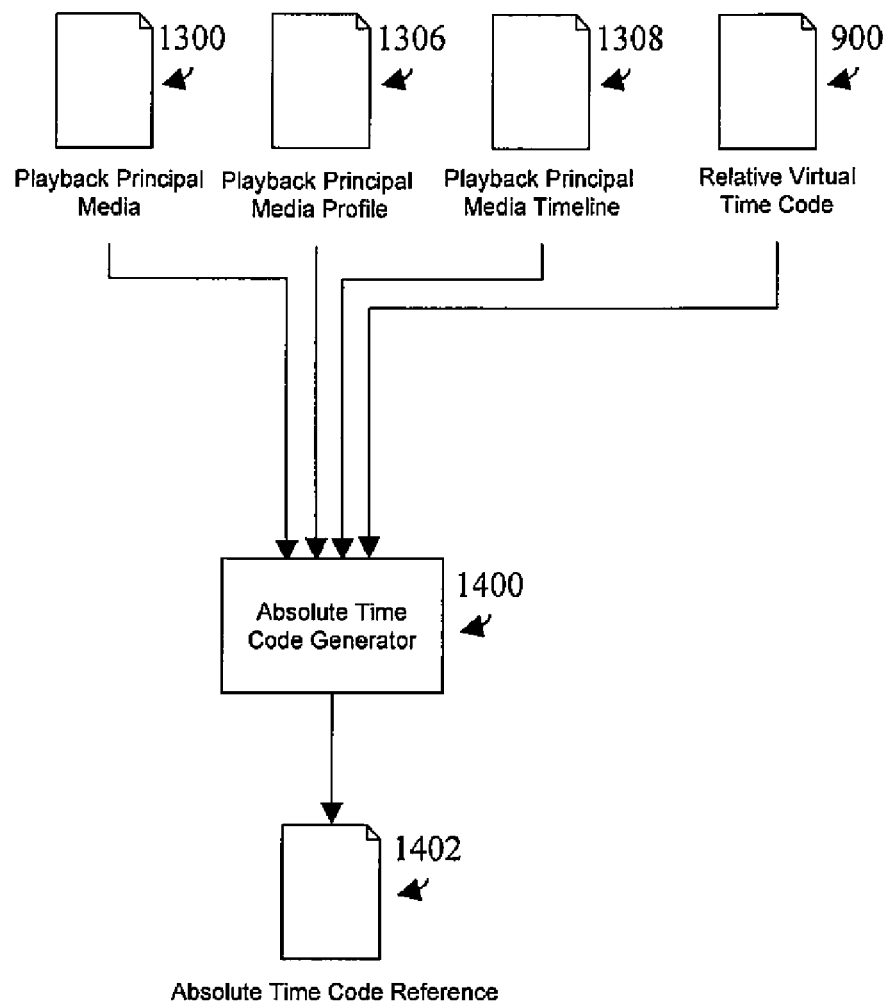
FIG. 14 is a flowchart detailing the operations to generate the absolute time code reference prior to the playback of the synchronous media set according to an embodiment.

FIG. 14 is flowchart illustration that identifies the processes, input and steps taken by one embodiment to generate an absolute time code reference 1402 for playback. In one embodiment, the absolute time code reference 1402 associated with playback is different than the absolute time code 606 contained an author's portable media project file 600. For example, if the original principal media and the playback principal media have differences between them, such differences could cause their respective absolute time codes to be different.

The system utilizes an absolute time code generator routine 1400 that uses the playback principal media file 1300, the playback principal media profile 1306 and the playback principal media timeline 1308 as input. The absolute time code generator 1400 also retrieves the relative virtual time code 900 from the portable media compositing file 206 for the synchronous media set.

The absolute time code generator's 1400 responsibility is to generate references to the playback principal media's internal time code by using the landmark definitions in the relative virtual time code 900. These definitions correspond to the synchronous events and relationships between the playback principal media 1300 and supplemental media files 710 as determined by the original authored presentation. The absolute time code generator 1400 uses a landmark identification analyzer process (shown in further detail in FIG. 15) that in one embodiment is a pluggable framework for employing and coordinating multiple landmark identification routines. Landmark identification routines can include but are not limited to audio analysis, video analysis, video frame analysis, compression stream analysis, closed captioning analysis, timecode analysis, etc. The landmark identification analyzer process of one embodiment employs information about each landmark identification routine to weight and rank the results from all of the available landmark identification routines. This ranking can be used to increase the likeliness of recognition and/or to minimize computational impact on the playback machine.

Figure 15:
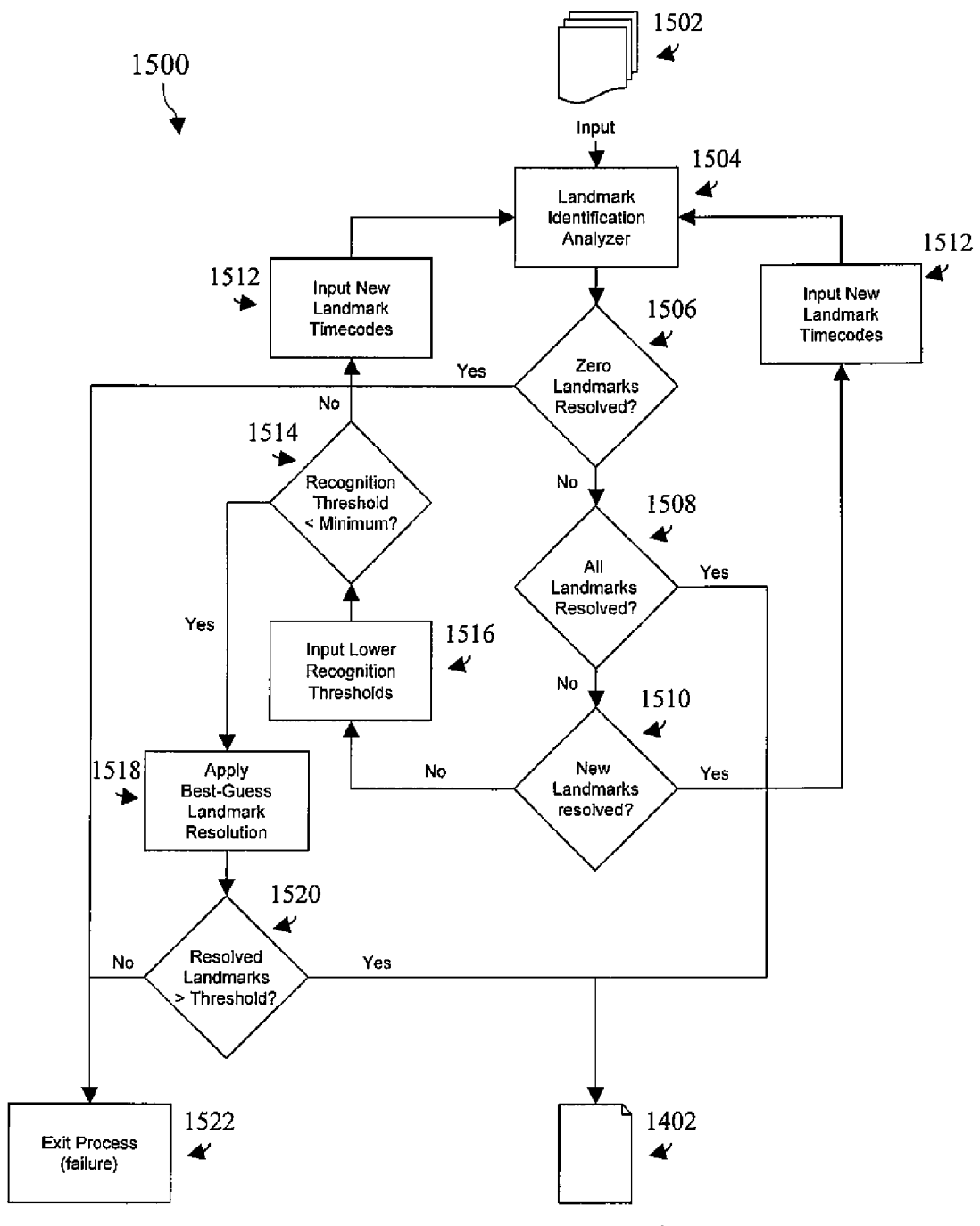
FIG. 15 is a flowchart showing one embodiment of a process for landmark resolution.

FIG. 15 is a flowchart 1500 of one example embodiment of the landmark resolution/identification process that can be used by the absolute time code generator 1400. Input 1502 into a landmark identification analyzer 1504 in FIG. 15 represents the inputs 1300, 1306, 1308, and 900 shown in FIG. 14.

The landmark identification analyzer 1504 makes analysis passes through the media input to resolve and tally the number of resolved landmarks, at 1506-1512. If the landmark identification analyzer 1504 does not get any resolved landmarks at 1506, it is assumed the input media is wrong or too different and the process exits at 1522, unable to create a new absolute time code.

If the landmark identification analyzer 1504 resolves all of the landmarks (e.g., using the same exact video) at 1508, then the process ends with the generation of the absolute time code 1402. If the landmark identification analyzer 1504 is not in an "all or none" state, then the landmark identification analyzer 1504 makes continuous passes using A) data from the newly resolved landmarks and B) relaxed/reduced recognition thresholds at 1516, 1514, and 1520. Eventually, the landmark identification analyzer 1504 arrives at a point where no new landmarks are resolved but enough exist to build a reasonable absolute time code 1402 and exits the recursive process. If there are still some unresolved landmarks, the landmark identification analyzer 1504 applies a best-guess algorithm at 1518 to place any unresolved landmarks, and the process exits at 1520 to generate the absolute time code reference 1402.

The absolute time code generator 1400 receives information from the landmark identification analyzer routine and determines if it has enough information to create an absolute time code 1402 that could be used to successfully play the playback principal media 1300 together with the supplemental media 710. If the absolute time code generator 1400 of one embodiment does not have enough information, it may instruct the landmark identification analyzer process to either: 1) utilize additional available landmark identification routines: or 2) process again previously process segments with information that was not available at the time the segments were originally processed.

The absolute time code generator 1400 compares the profiles of the original principal media 610 and the playback principal media 1300 in order to produce a new master timeline and presentation space. This process involves matching up segments and scenes, determining if segments are missing or have been added, and determining if display elements have been altered.

Next, segments from the synchronous media are placed into the new timeline. The absolute time code generator 1400 matches patterns, resolves landmarks, and handles degenerate cases such as clipping or time difference resolution. Any visual aspects of the synchronous media elements are fitted into the presentation space for the playback media file. The absolute time code generator 1400 matches patterns, resolves landmarks, and handles degenerate cases such as stretching or clipping the supplemental content or location for the visual content.

Finally, the absolute time code generator 1400 compiles a new timeline for the synchronous media elements that fit into the new presentation of the playback principal media 1300.

When the absolute time code generator 1400 has determined it has enough information to create an absolute time code reference 1402, it ends the analysis and saves the absolute time code reference 1402 file belonging to the synchronous media set. The absolute time code reference 1402 contains timelines and mixing information for the playback principal and supplemental media files 1300 and 710. The absolute time code reference 1402 also contains information that describes the relationships between visual elements in the synchronous media set.

Figure 16:
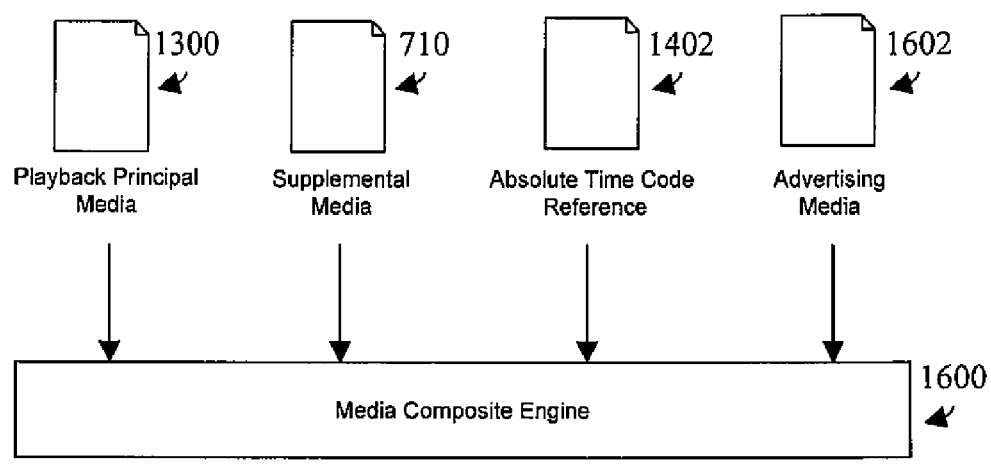
FIG. 16 is a flowchart showing example elements that feed a media composite engine to assemble the synchronous media set for proper playback according to an embodiment.

With the absolute time code reference 1402 generated, a media composite engine 1600 of FIG. 16 can now assemble the instructions to successfully play the playback principal and supplemental media files 1300 and 710 as originally intended by the author, using one or more tools to perform the assembly and playback. FIG. 16 illustrates the flowchart for compositing the synchronous media set according to an embodiment. The media composite engine 1600 composites the playback principal media 1300 with the supplemental media 710 based on the instructions contained in the absolute time code reference 1402. The media composite engine 1600 may also introduce additional media files 1602 into the composition. An example of an additional media file could be an advertisement video that is played before, after or at any point in the timeline of the playback principal media 1300.

When finished with compositing, the media composite engine 1600 can output and/or save the composition in any number of ways including saved as a single file, saved as multiple files, streamed to a device or sent to an interactive media player. Playback does not require a specific interactive media player nor does it require changes to the code of an interactive media player. Playback could be accomplished through file formats or plug-ins supported by an interactive media player.

Regardless of the final mechanism for delivering the presentation, the result is a composite multimedia presentation that behaves like one synchronized unit, even though original principal media file 610 and the playback principal media file 1300 were created independently and unrelated to each other. The supplemental media 710 elements synchronize perfectly with the playback principal media 1300, visually and in time.

While the various flowcharts provided herein show certain operations performed in a certain order, other embodiments can provide different implementations. For example, with other embodiments, certain operations can be added, removed, modified, or combined. Moreover, the operations need not necessarily occur in the exact order shown.

In at least one embodiment, the operations can be embodied by software or other machine-readable instruction stored on a machine-readable medium and executable by one or more processors. For example, the machine-readable instructions and machine-readable medium can be located at a server and/or at a client device.

While specific embodiments and applications of the present invention have been described and illustrated, it is to be understood that the invention is not limited to the precise description, configuration and elements disclosed. While specific embodiments and examples are described herein for illustrative purposes, various equivalent modifications are possible within the scope of the invention and can be made without deviating from the spirit and scope of the invention.

For example, while this description utilizes a network-connected client and server, the embodiment(s) can also be applied to scenarios that involve portable devices which can be connected to a network but which are not always connected to the network. Variations and modifications apparent to those skilled in the art may be made in the arrangement, application, and details of the methods and systems of the present invention disclosed herein without changing the spirit and scope of the invention.

In the various embodiments described above, certain elements have been referred to as "files" that are generated, such as a portable media project file, a portable media compositing file, a timeline file, and so forth. It is appreciated that the "files" and various other elements (such as profiles, metadata, time codes, etc.) described above can comprise data structures that are newly generated, data structures that can be stored for later use during authoring/playback, or other types of data structures.

These and other modifications can be made to the invention in light of the above detailed description. The terms used in the following claims should not be construed to limit the invention to the specific embodiments disclosed in the specification and the claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A method, comprising:
    enabling authoring of a media set;
    enabling selection of a first independent media element, associated with a first entity, as a principal media element;
    enabling selection of at least a second independent media element, associated with a second entity, as a supplemental media element;
    extracting principal media metadata from the principal media element;
    determining properties of the principal media element;
    generating a principal media profile representing the principal media metadata and properties; and
    extracting and analyzing content of the principal media element, using as inputs, the principal media element, the principal media profile, and at least some results of media compositing;
    generating a principal media timeline, which is an outline representation of the extracted and analyzed content of the principal media element, including relationship information between the content; and
    enabling presenting of the first and second media elements together as the media set in a synchronous manner using a relative virtual time code, wherein said relative virtual time code includes an intermediary data structure containing a collection of patterns and time-based relationships used to generate an absolute time code for variations of the media elements in the synchronous media set and wherein said absolute time code includes a fixed time code for specific instances of the media elements in the synchronous media set,
    wherein said authoring of the media set includes:
        selecting the first media element as said principal media element;
        selecting or creating the second media element as said supplemental media element;
        performing media compositing to relate presentation of the principal and supplemental media elements to each other;
        generating a portable media project file that contains results of the media compositing;
        generating a portable media compositing file from the portable media project file; and
        publishing the portable media compositing file, the portable media compositing file being usable to allow presentation of the media set in the synchronous manner.

2. The method of claim 1 wherein said authoring or said presenting the media set includes using at least one recognition algorithm to identify landmarks in the first media element and to determine a manner in which to present the second media element synchronously with the first media element based on the landmarks.

3. The method of claim 1 wherein the portable media project file includes:
   a link to the principal media element and a link to at least one of said supplemental media element;
   said principal media metadata and supplemental media metadata;
   said principal media timeline;
   mixing data representing presentation relationships between the principal and supplemental media elements; and
   a first absolute time code to match segments of the supplemental media element and mixing data with locations in the principal media element using the principal media timeline as reference.

4. The method of claim 3 wherein said performing the media compositing includes generating the first absolute time code, generating the mixing data, and obtaining the supplemental media metadata, which collectively comprise the results of the media compositing.

5. The method of claim 4 wherein said generating the portable media project file that contains the results of the media compositing includes:
   said extracting the principal media metadata from the principal media element;
   said determining properties of the principal media element;
   said generating a principal media profile representing the principal media metadata and properties;
   said extracting and analyzing content of the principal media element, using as inputs, the principal media element, the principal media profile, and at least some of the results of the media compositing;
   said generating the principal media timeline, which is the outline representation of the extracted and analyzed content of the principal media, including relationship information between the content; and
   saving the portable media project file.

6. The method of claim 5 wherein the portable media compositing file includes:
   the link to at least one of said supplemental media element;
   the mixing data;
   the principal media metadata and supplemental media metadata; and
   said relative virtual time code associated with the media set and having information usable to translate said first absolute time code, which is associated with an original principal media element, into a second absolute time code of a playback principal media element, thereby providing a correspondence between points of the original principal media element and points of the playback principal media element.

7. The method of claim 6 wherein said generating the portable media compositing file from the portable media project file includes:
   using the principal media element as a first input;
   using the portable media project file as a second input;
   using the first and second inputs, generating landmark definitions associated with events and relationships between the principal and supplemental media elements;
   generating the relative virtual time code based on the generated landmark definitions and the principal media timeline; and
   saving the portable media compositing file.

8. The method of claim 1 wherein said enabling selection of the first media element or said enabling selection of at least the second media element respectively includes providing the first media element or providing the second media element from a network location.

9. The method of claim 1 wherein said enabling selection of the first media element or said enabling selection of at least the second media element respectively includes providing the first media element or providing the second media element from a portable storage device.

10. The method of claim 1 wherein said presenting the media set in the synchronous manner includes:
    selecting the supplemental media element;
    selecting a playback principal media element;
    obtaining said published portable media compositing file;
    performing media compositing to relate the selected principal media element and the selected supplemental media element to each other using the portable media compositing file; and
    playing back the media set, having the composited principal media supplemental media elements, in the synchronous manner.

11. The method of claim 1 wherein said presenting the media set in the synchronous manner includes:
    selecting a playback principal media element;
    presenting a list of available supplemental media elements;
    selecting at least one of the supplemental media elements from the list;
    obtaining said published portable media compositing file;
    performing media compositing to relate the selected principal media element and the selected supplemental media element to each other using the portable media compositing file; and
    playing back the media set, having the composited principal media supplemental media elements, in the synchronized manner.

12. The method of claim 10, further comprising prior to said playing back the media set:
    extracting the principal media metadata from the playback principal media element;
    determining properties of the playback principal media element;
    generating a playback principal media profile representing the playback principal media metadata and properties;
    extracting and analyzing content of the playback principal media element, using as inputs, the playback principal media profile, the playback principal media element, and original principal media metadata that is contained in the portable media compositing file and that corresponds to an original principal media element involved in an authoring process; and
    generating a playback principal media timeline, which is an outline representation of the extracted and analyzed content of the playback principal media, including relationship information between the content.

13. The method of claim 12, further comprising:
    using the playback principal media element as a first input;
    using the playback principal media profile as a second input;
    using the playback principal media timeline as a third input;
    using the relative virtual time code, contained in the portable media compositing file, as a fourth input;

using landmark definitions in the relative virtual time code of the fourth input to generate references to the playback principal media timeline of the third input, the landmark definitions corresponding to synchronous events and relationships between the playback principal media element and the supplemental media element as determined in the authoring process;

comparing the playback principal media profile with the original principal media metadata that is contained in the portable media compositing file to generate a new timeline and a presentation space;

associating segments of the playback principal media element and segments of the supplemental into the new timeline in a manner that fits the presentation space; and using the references generated using the landmark definitions to obtain an absolute time code reference, the absolute time code reference including the new timeline, mixing data, and information describing relationships between elements of the playback principal media element and the supplemental media element in the media set.

14. The method of claim 13 wherein said playing back the media set includes:

compositing the playback principal media element and the supplemental media element using instructions in the absolute time code reference;

optionally introducing an additional media element into the composition; and providing the composition to a display device or to a storage device.

15. The method of claim 14 wherein said introducing the additional media element into the composition includes introducing an advertisement into the composition.

16. The method of claim 1, further comprising prior to said presenting the synchronous media set:

providing a plurality of inputs that include said relative virtual time code and information associated with a playback version of said first media element; and generating said absolute time code from said inputs to identify landmarks usable to present the playback first media element and the second media element as the synchronous media set, said identifying of landmarks including applying a threshold process and a best-guess process to said inputs.

17. The method of claim 1 wherein:

the first media element or the second media element is selectable from a source that includes at least one of: a broadcast, an online source, local storage, a portable storage medium, or a DVD; and the first and second media elements are dynamically synchronized from at least one incoming stream.

18. A system, comprising:

means for authoring a media set;

means for providing a first independent media element, associated with a first entity, as a principal media element;

means for providing at least a second independent media element associated with a second entity, as a supplemental media element;

means for extracting principal media metadata from the principal media element and for determining properties of the principal media element, and further for generating a principal media profile representing the principal media metadata and properties;

means for extracting and analyzing content of the principal media element, using as inputs, the principal media element, the principal media profile, and at least some results of media compositing, and for generating a principal media timeline, which is an outline representation of the extracted and analyzed content of the principal media element, including relationship information between the content; and means for presenting the first and second media elements together as the media set in a synchronous manner using a relative virtual time code, wherein said relative virtual time code includes an intermediary data structure containing a collection of patterns and time-based relationships used to generate an absolute time code for variations of the media elements in the synchronous media set and wherein said absolute time code includes a fixed time code for specific instances of the media elements in the synchronous media set, wherein the means for authoring the media set includes:

means for selecting the first media element as said principal media element;

means for selecting or creating the second media element as said supplemental media element;

means for performing media compositing to relate presentation of the principal and supplemental media elements to each other;

means for generating a portable media project file that contains results of the media compositing;

means for generating a portable media compositing file from the portable media project file; and means for publishing the portable media compositing file, the portable media compositing file being usable to allow presentation of the media set in the synchronous manner.

19. The system of claim 18 wherein the means for presenting the media set in the synchronized manner includes:

means for selecting the supplemental media element;

means for selecting a playback principal media element;

means for obtaining the published portable media compositing file;

means for performing media compositing to relate the selected principal media element and the selected supplemental media element to each other using the portable media compositing file; and means for playing back the media set, having the composited principal media supplemental media elements, in the synchronous manner.

20. The system of claim 19, further comprising:

means for generating a playback principal media timeline;

means for generating said absolute time code using at least the playback principal media timeline; and means for compositing the playback principal media element and the supplemental media element for playback using the absolute time code.

21. The system of claim 18 wherein:

the first media element or the second media element is selectable from a source that includes at least one of: a broadcast, an online source, local storage, a portable storage medium, or a DVD; and the first and second media elements are dynamically synchronized from at least one incoming stream.

22. An authoring apparatus, comprising:

a computing device to provide a plurality of tools, the plurality of tools including:

a first tool to select a first independent media element, associated with a first entity, as a principal media element;

a second tool to select or create a second independent media element, associated with a second entity, as a supplemental media element;

a third tool to perform media compositing to relate presentation of the principal and supplemental media elements to each other;

a fourth tool to generate a portable media project file that contains results of the media compositing;

a fifth tool to generate a portable media compositing file from the portable media project file; and a sixth tool to publish the portable media compositing file, the portable media compositing file being usable to allow presentation of the media set in a synchronous manner using a relative virtual time code, wherein said relative virtual time code includes an intermediary data structure containing a collection of patterns and time-based relationships used to generate an absolute time code for variations of the media elements in the synchronous media set and wherein said absolute time code includes a fixed time code for specific instances of the media elements in the synchronous media set, wherein the fourth tool includes:

a principal media analyzer to extract principal media metadata from the principal media element and to determine properties of the principal media element, and to further generate a principal media profile representing the principal media metadata and properties; and a principal media timeline analyzer operatively coupled to the principal media analyzer to extract and analyze content of the principal media element, using as inputs, the principal media element, the principal media profile, and at least some of the results of the media compositing, the principal media timeline analyzer being adapted to generate the principal media timeline, which is an outline representation of the extracted and analyzed content of the principal media element, including relationship information between the content.

23. The apparatus of claim 22 wherein the fifth tool includes:

a virtual time code generator having the principal media element as a first input and having the portable media project file as a second input; and a landmark identification analyzer operatively coupled to the virtual time code generator to use the first and second inputs to generate landmark definitions associated with events and relationships between the principal and supplemental media elements, wherein the virtual time code generator is adapted to generate the relative virtual time code based on the generated landmark definitions and the principal media timeline.

24. The apparatus of claim 22 wherein:

the first media element or the second media element is selectable from a source that includes at least one of: a broadcast, an online source, local storage, or a portable storage medium, or a DVD; and the computing device is configured to enable dynamic synchronization of the first and second media elements, which are contained at least one incoming stream.

25. A presentation apparatus, comprising:

a computing device to provide a plurality of tools, the plurality of tools including:

a first tool to select a playback principal media element, the playback principal media element being an independent media element associated with a first entity;

a second tool to select at least one supplemental media element, the supplemental media element being an independent media element associated with a second entity;

a third tool to obtain a published portable media compositing file;

a fourth tool to perform media compositing to relate the selected principal media element and the selected supplemental media element to each other using the portable media compositing file; and a fifth tool to control playback of the media set, having the composited principal media supplemental media elements, in a synchronous manner using a relative virtual time code, wherein said relative virtual time code includes an intermediary data structure containing a collection of patterns and time-based relationships used to generate an absolute time code for variations of the media elements in the synchronous media set and wherein said absolute time code includes a fixed time code for specific instances of the media elements in the synchronous media set;

a principal media analyzer to extract the principal media metadata from the playback principal media element and to determine properties of the playback principal media element, and to further generate a playback principal media profile representing the playback principal media metadata and properties; and a principal media timeline analyzer to extract and analyze content of the playback principal media element, using as inputs, the playback principal media profile, the playback principal media element and original principal media metadata that is contained in the portable media compositing file and that corresponds to an original principal media element involved in an authoring process, the principal media timeline analyzer being adapted to generate a playback principal media timeline, which is an outline representation of the extracted and analyzed content of the playback principal media element, including relationship information.

26. The apparatus of claim 25, further comprising:

an absolute time code generator having the playback principal media element as a first input, the playback principal media profile as a second input, the playback principal media timeline as a third input, and the relative virtual time code contained in the portable media compositing file as a fourth input; and a landmark identification analyzer, operatively coupled to the absolute time code generator, to use landmark definitions in the relative virtual time code of the fourth input to generate references to the playback principal media timeline of the third input, the landmark definitions corresponding to synchronous events and relationships between the playback principal media element and the supplemental media element as determined in the authoring process, wherein the absolute time code generator is adapted to compare the playback principal media profile with the original principal media metadata that is contained in the portable media compositing file to generate a new timeline and a presentation space, to associate segments of the playback principal media element and segments of the supplemental into the new timeline in a manner that fits the presentation space, and to use the references generated using the landmark definitions to obtain said absolute time code, the absolute time code including the new timeline, mixing data, and information describing relationships between elements of the playback principal media element and the supplemental media element in the media set.

27. The apparatus of claim 25 wherein:

the first media element or the second media element is selectable from a source that includes at least one of: a broadcast, an online source, local storage, a portable storage medium, or a DVD; and the computing device is configured to enable dynamic synchronization of the first and second media elements, which are contained at least one incoming stream.

* * * * *